(12) United States Patent
Mori

(10) Patent No.: US 7,263,745 B2
(45) Date of Patent: Sep. 4, 2007

(54) BINDING BAND

(76) Inventor: Kenji Mori, 2041-1, Naka, Tamana-city, Kumamoto, 8650064 (JP)

( * ) Notice: Subject to any disclaimer, the term of this patent is extended or adjusted under 35 U.S.C. 154(b) by 88 days.

(21) Appl. No.: 11/195,240

(22) Filed: Aug. 2, 2005

(65) Prior Publication Data

US 2007/0028425 A1 Feb. 8, 2007

(51) Int. Cl.
*B65D 63/00* (2006.01)
(52) U.S. Cl. .............. 24/16 PB; 24/30.5 R; 24/30.5 P
(58) Field of Classification Search ............. None
See application file for complete search history.

(56) References Cited

U.S. PATENT DOCUMENTS

| | | | | |
|---|---|---|---|---|
| 515,747 | A * | 3/1894 | Carr ..................... | 24/16 PB |
| 2,551,384 | A * | 5/1951 | Middleton et al. ...... | 24/16 PB |
| 3,049,778 | A * | 8/1962 | Weckesser ............. | 24/16 PB |
| 3,112,496 | A * | 12/1963 | Dritz .................... | 24/17 AP |
| 3,300,825 | A * | 1/1967 | Andreasen ............. | 24/16 PB |
| 3,731,347 | A * | 5/1973 | Caveney et al. ........ | 24/16 PB |
| 4,092,765 | A * | 6/1978 | Joyce ................... | 24/16 PB |
| 4,750,241 | A * | 6/1988 | Powell .................. | 24/20 R |
| 4,862,561 | A * | 9/1989 | Lichtenberg ........... | 24/16 PB |
| 7,100,248 | B2 * | 9/2006 | Crook ................... | 24/16 PB |
| 2002/0152588 | A1 * | 10/2002 | Robley .................. | 24/16 PB |
| 2003/0088948 | A1 * | 5/2003 | Cook .................... | 24/16 PB |

FOREIGN PATENT DOCUMENTS

| | | |
|---|---|---|
| JP | 48-91479 | 11/1973 |
| JP | 2003-237823 | 8/2003 |

* cited by examiner

*Primary Examiner*—Robert J. Sandy
(74) *Attorney, Agent, or Firm*—Jordan and Hamburg LLP

(57) ABSTRACT

It is an object of the present invention to provide a binding band facilitating unbinding work and having a high binding force. A binding band comprising: a band body having a plurality of engagement teeth on a surface thereof; a guide fixed to the band body and forming an insertion hole having a height substantially equal to the thickness of the band body between the guide and the band body; and wherein a surface of the band body positioned in the insertion hole is smooth.

12 Claims, 11 Drawing Sheets

FIG.5A
FIG.5B
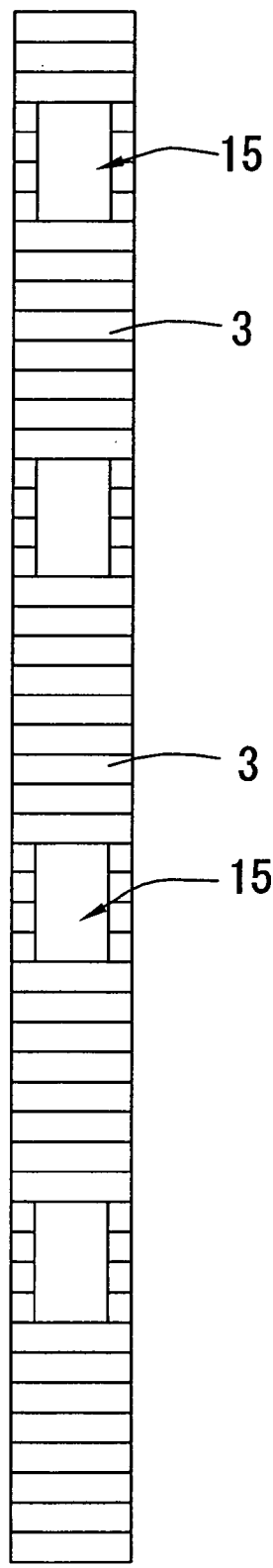
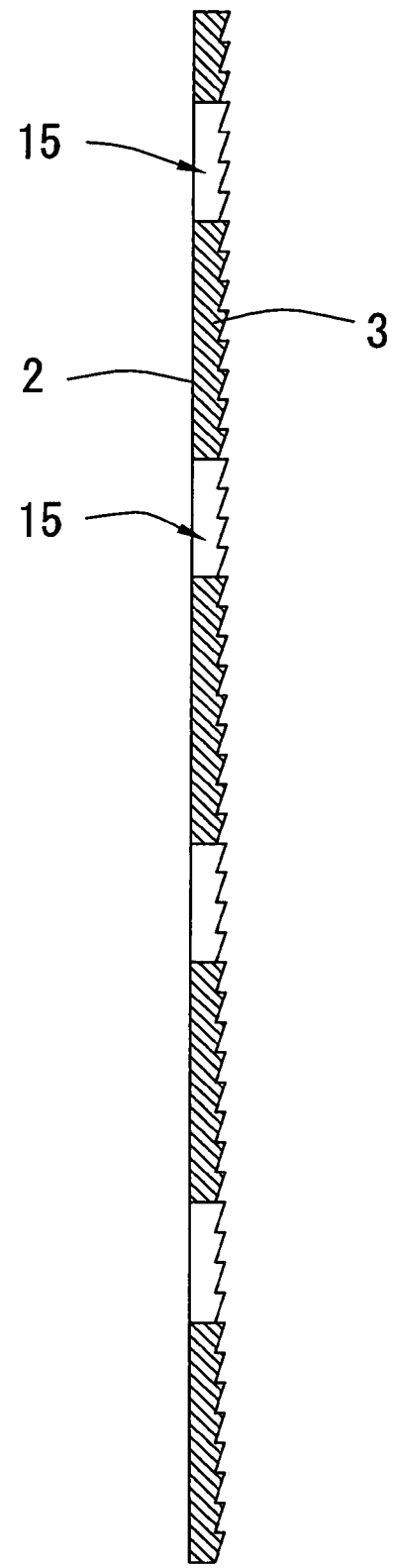

FIG.7A
FIG.7B
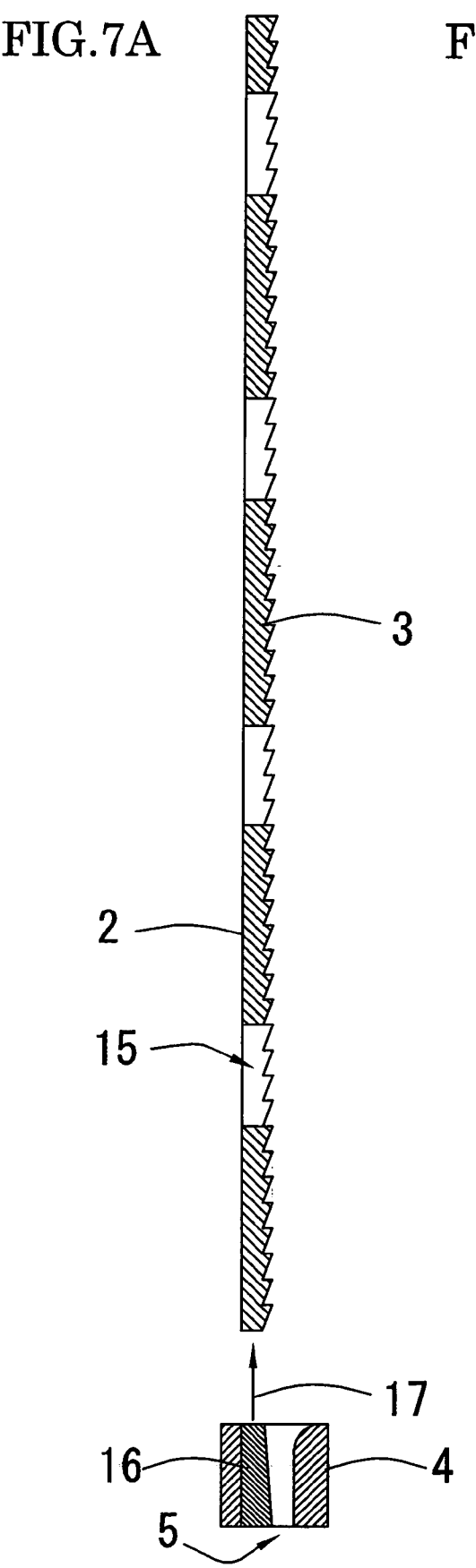
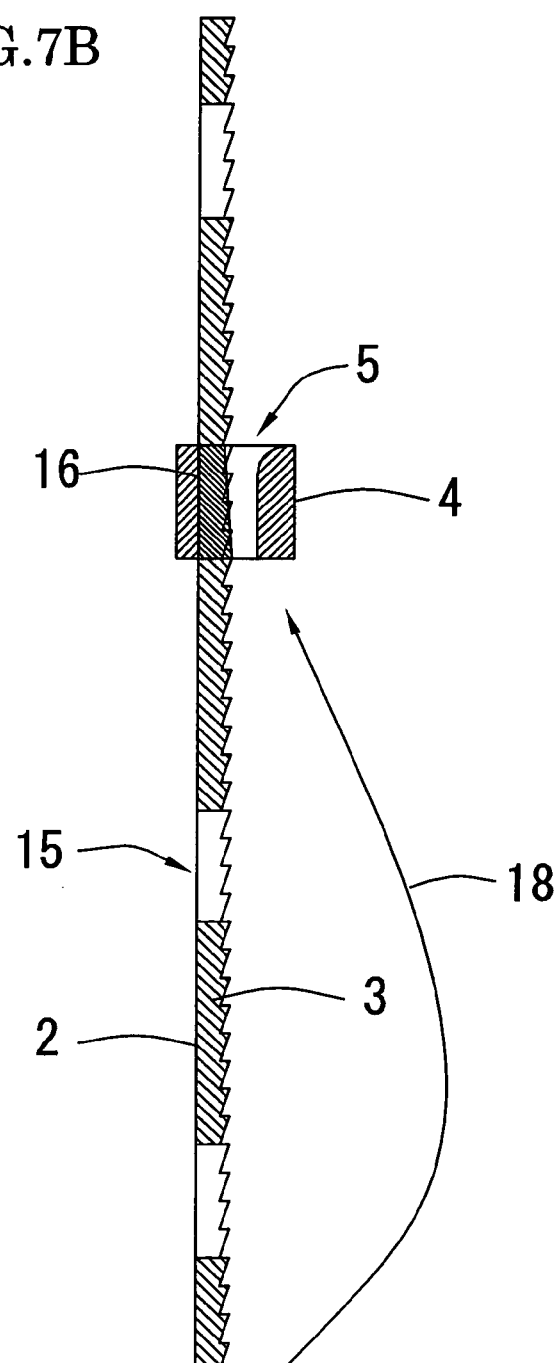

FIG.8A
FIG.8B
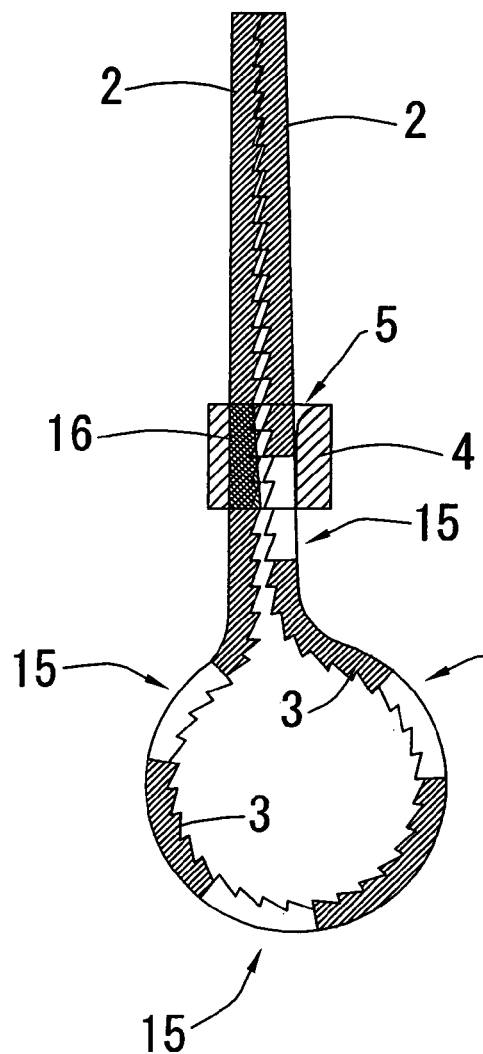
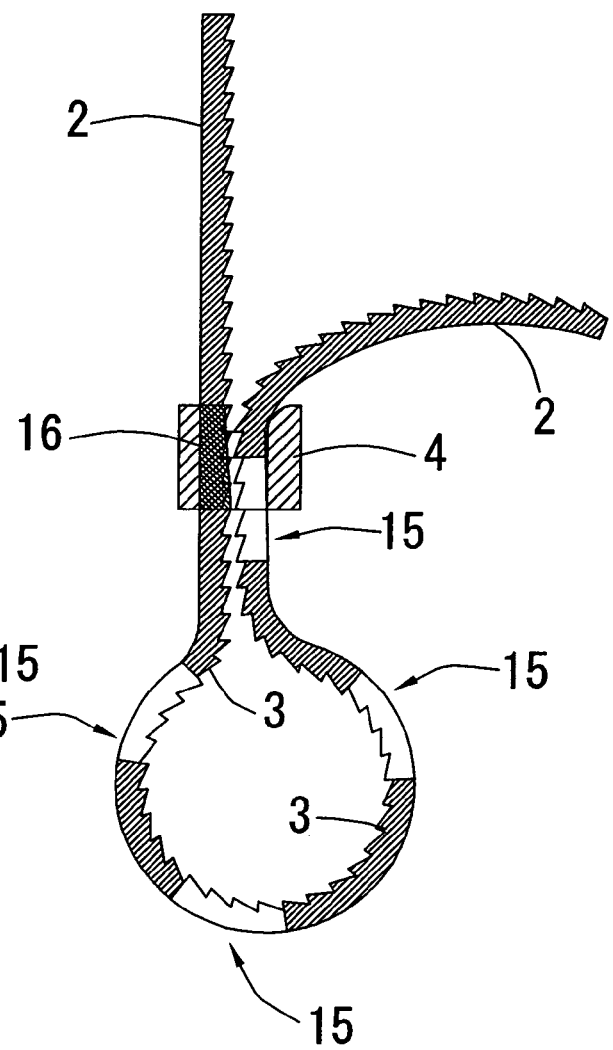

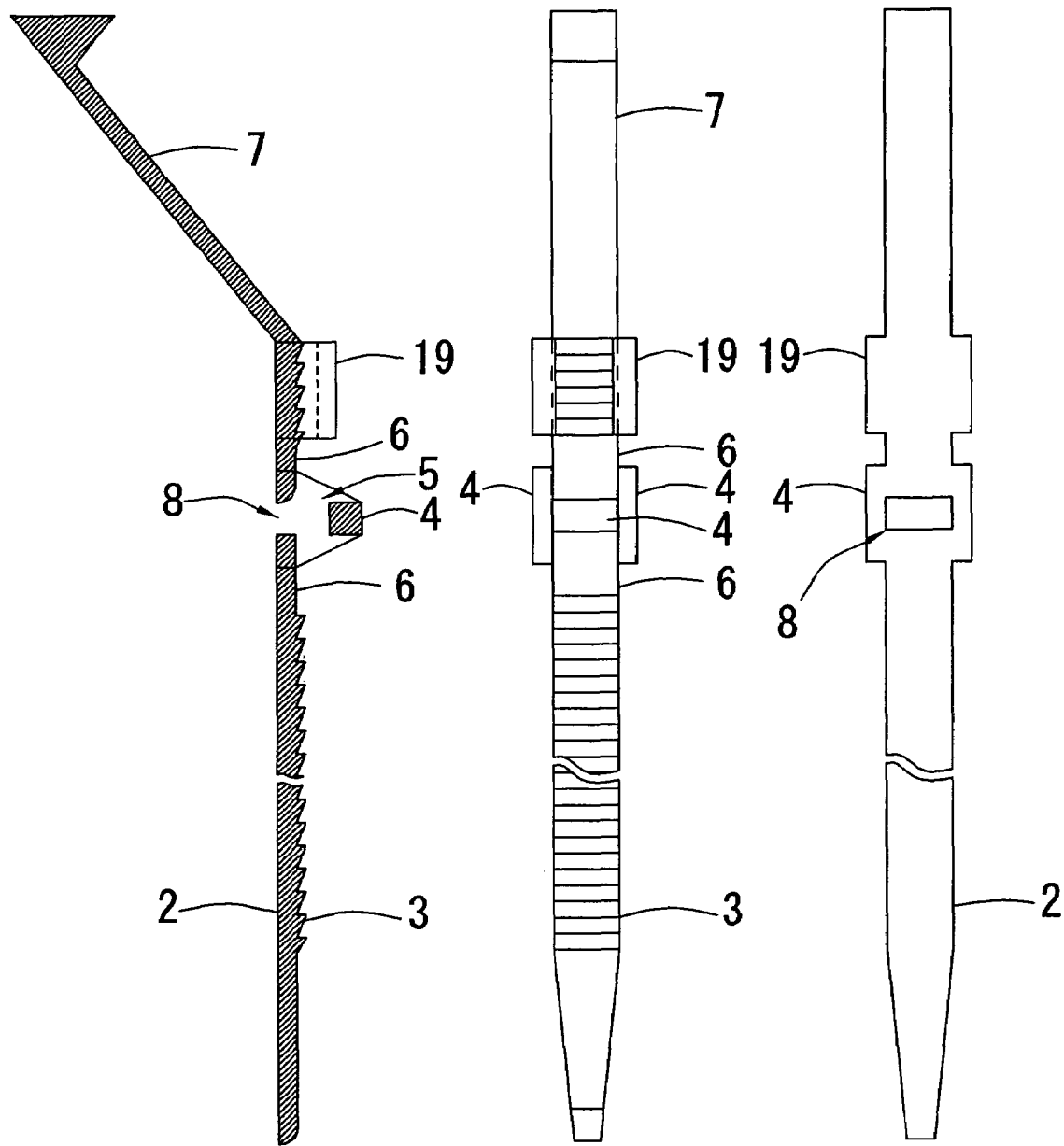

FIG.11A
(PRIOR ART)
FIG.11B
(PRIOR ART)
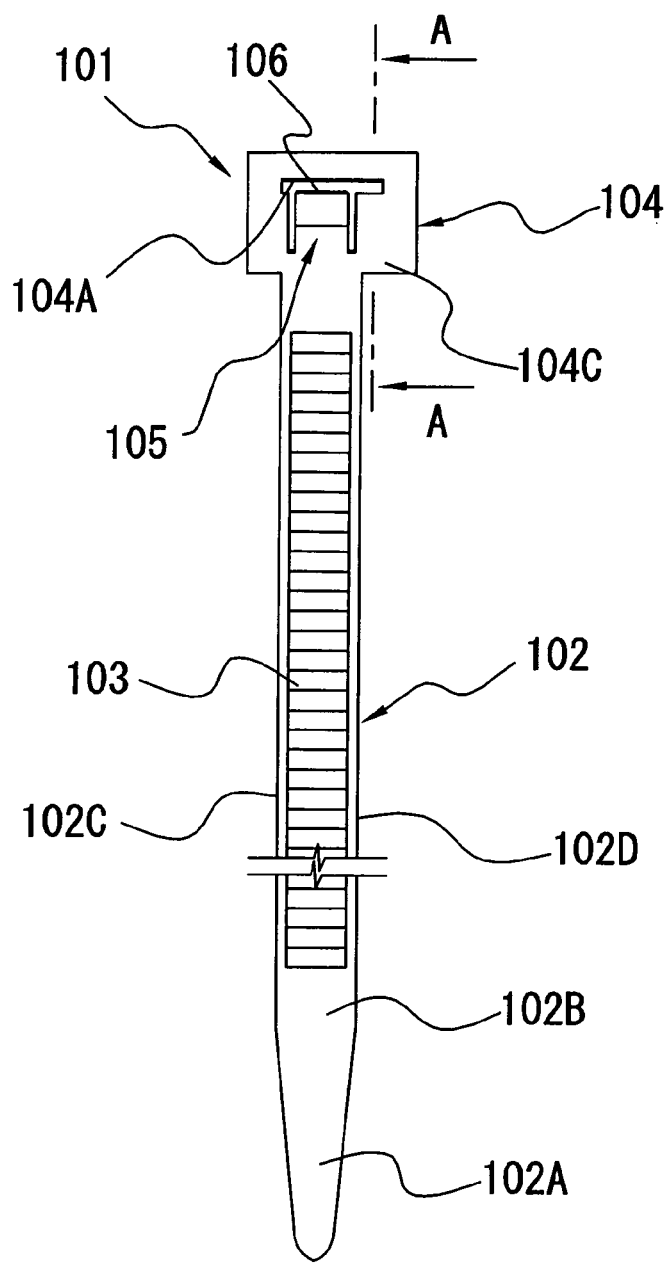
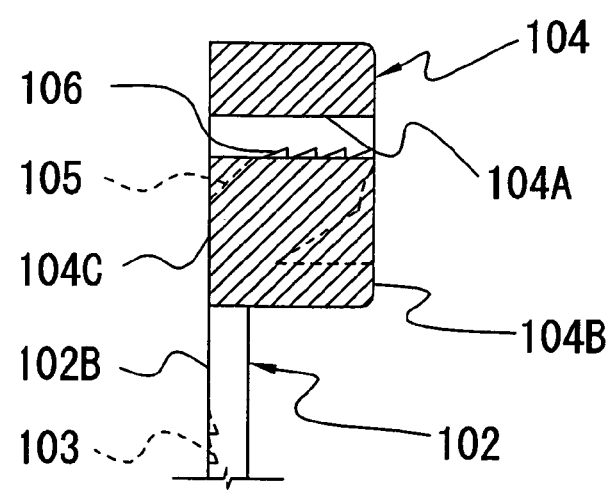

BINDING BAND

BACKGROUND OF THE INVENTION

(1) Field of the Invention

The present invention relates to a binding band. Particularly, the present invention relates to a binding band facilitating unbinding work after binding.

(2) Description of Related Art

Recently, the binding band for binding wire-like bodies such as an electric wire bundles for vehicles, an optical fiber bundle and an air piping bundle to lock and fix them to a desired attaching surface, has been widely used. Particularly, in a wire harness attached in a vehicle, the binding band is often used to fix trunks in which electric wires in large quantity are gathered and bundled and to fix branches which are arranged in electric and electronic components.

Examples of binding bands are a belt, which is passed through a buckle provided at one end of the belt from the other end side and arranged in an annular shape, and by which wiring or the like is bound. However, so as to prevent the release of the binding state, gear teeth engaging with each other are provided to the buckle and the belt to prevent the belt from drawing out from the buckle.

However, since the belt which cannot be drawn out and reused even after binding is inconvenient, various binding bands capable of being drawn out and reused even after binding have been proposed.

For example, a conventional binding band 101 described in Japanese Published Unexamined Patent Application No. 2003-237823 is provided with a plate-like band 102, and a frame-like buckle 104 formed at the one end of the band. An insertion hole 104A is formed on the buckle 104. A back 104C of the buckle 104 and a back 102B of the band 102 are positioned on the same plane. A plurality of engagement teeth 103 are successively provided along the longitudinal direction of the band 102 on the back 102B of the band 102. A tip 102A formed on the side opposite to the buckle 104 becomes narrower toward the end. A flat guard 102C and a flat guard 102D are respectively formed on both left and right sides of the teeth 103. The buckle 104 is provided with a ratchet piece 105 erected from one side of the band 102 of the insertion hole 104A. A plurality of engagement teeth 106 capable of being engaged with the engagement teeth 103 of the band 102 are provided on the surface facing the insertion hole 104A of the ratchet piece 105. A smooth surface is formed on the right side of the engagement teeth 106 as shown in FIG. 11A. The flat guard 102C and the flat guard 102D slide on the smooth surface by deviating the band 102 inserted into the insertion hole 104A in the direction of the smooth surface, and thereby the bind can be released.

FIG. 11A is a schematic rear view of a conventional binding band. FIG. 11B is a sectional view of FIG. 11A taken along line A-A.

BRIEF SUMMARY OF THE INVENTION

However, since structure of the conventional binding band makes procedures for withdrawal of the belt after binding complicated, binding bands have been required, in which the bind is easily released and which exhibits a high binding force.

The present invention has been accomplished in view of the problems described above. It is an object of the present invention to provide a binding band facilitating unbinding work and having a high binding force.

To attain the above object, a binding band according to the present invention comprises: a band body having an engaging means on a surface thereof; a guide fixed to the band body and forming an insertion hole having a height substantially equal to the thickness of the band body between the guide and the band body; and wherein a surface of the band body positioned in the insertion hole is smooth.

Here, because of the smooth surface of the band body positioned in the insertion hole, when the end of the band body is inserted into the insertion hole, and an object to be bound is bound by surrounding the object to be bound, the engaging means is hardly engaged in the insertion hole. The band bodies are pressed to each other with the guide as a fulcrum near both ends of the band body positioned outside the insertion hole, thereby strengthening the engagement of the engaging means. "The thickness of the band body" means a thickness including the engaging means.

Since the engaging means is not engaged in the insertion hole, when the engagement near both ends of the band body positioned outside the insertion hole is released, the band body slides on the smooth surface of the band body positioned in the insertion hole, thereby releasing the engagement easily.

The binding band according to the present invention exhibits effects in facilitating unbinding work and showing a high binding force.

BRIEF DESCRIPTION OF THE DRAWINGS

FIG. 5A is a schematic plan view showing another embodiment of the band body constituting the binding band to which the present invention is applied.

FIG. 5B is a schematic sectional view of the band body of FIG. 5A.

FIG. 7A is a schematic sectional view showing a situation in which the guide is to be attached to the band body.

FIG. 7B is a schematic sectional view showing a situation in which the guide is attached to the band body.

FIG. 8A is a schematic sectional view of the binding band in the state of being bound.

FIG. 8B is a schematic sectional view of the binding band in the state where the bind is released.

FIG. 9A is a schematic sectional view of the binding band to which the present invention shown in FIG. 2 is applied and to which a band body fixer is attached.

FIG. 9B is a schematic plan view of the binding band to which the present invention shown in FIG. 2 is applied and to which the band body fixer is attached.

FIG. 9C is a schematic bottom view of the binding band to which the present invention shown in FIG. 2 is applied and to which the band body fixer is attached.

FIG. 11A is a schematic rear view of a conventional binding band.

FIG. 11B is a sectional view of FIG. 11A taken along line A-A.

DETAILED DESCRIPTION OF THE INVENTION

Figure 1:
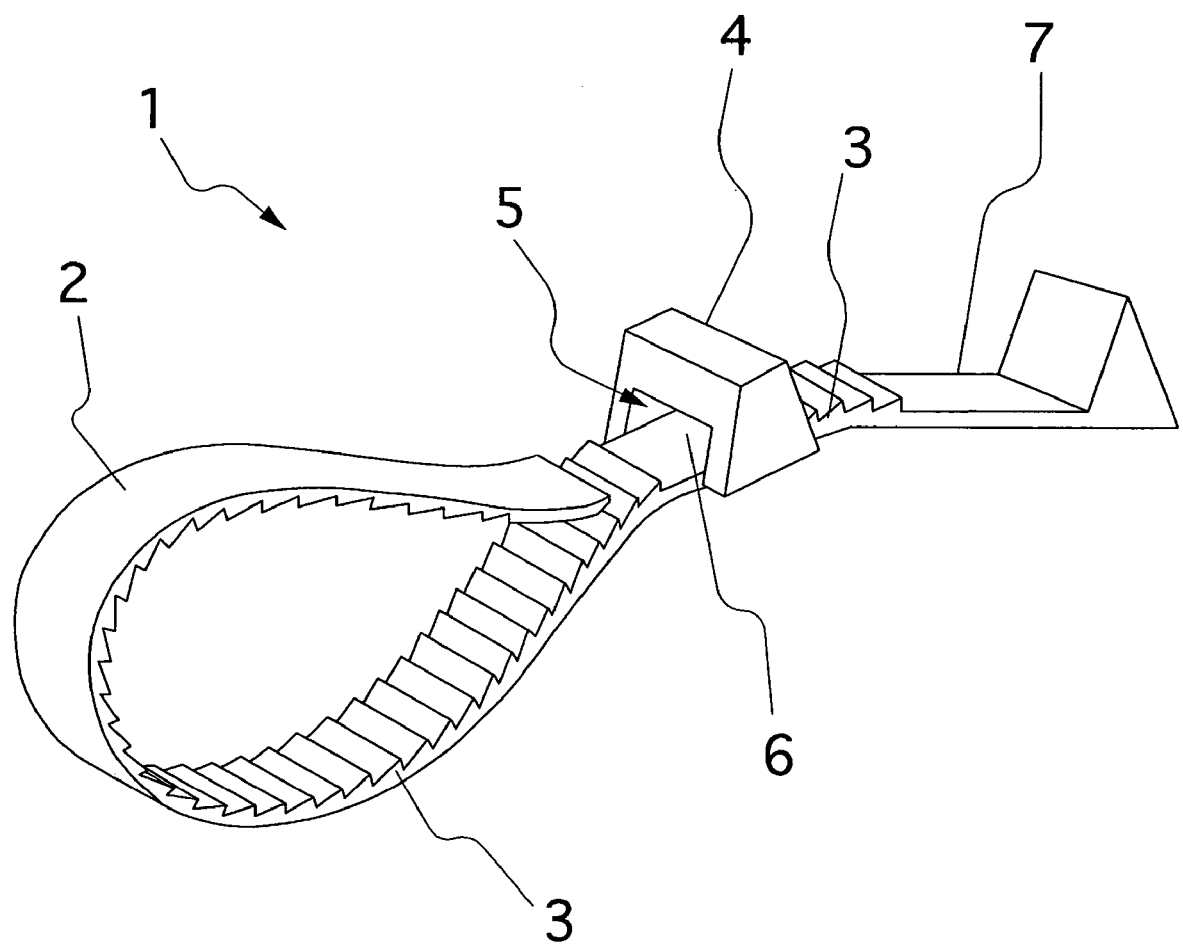
FIG. 1 is a schematic perspective view showing an embodiment of a binding band to which the present invention is applied.

Now, with reference to the figures, embodiments of the present invention are described below and are provided for understanding of the present invention. FIG. 1 is a schematic perspective view showing an embodiment of a binding band to which the present invention is applied. As shown in FIG. 1, a binding band 1 to which the present invention is applied is composed of a band body 2 having a surface having a plurality of engagement teeth 3 (an example of an engaging means) and being made of a resin, a guide 4 fixed to the band body, forming an insertion hole 5 having a height substantially equal to the thickness of the band body between the guide and the band body, and being made of a resin, and a release means 7 attached to one end of the band body 2, releasing the engagement of the engagement teeth by hooking a finger and being made of a resin. The surface of the band body positioned in the insertion hole is a smooth surface 6. Upper and lower sides of the guide 4 are approximately in parallel in the longitudinal direction of the band body, and the length of the upper side is different from that of the lower side. The release means 7 is obliquely attached to the surface of the band body on which the engagement teeth are formed. Furthermore, the engagement teeth 3 substantially extend over the whole width of the band body. When an object to be bound is bound, the other end of the band body 2 to which the release means is not attached is passed through the insertion hole 5, and thereby both ends of the band body are directed in nearly the same direction.

Here, if the binding band is provided with the band body having the engaging means on the surface thereof; and if the guide fixed to the band body and forming the insertion hole having the height substantially equal to the thickness of the band body between the guide and the band body, and if the surface of the band body positioned in the insertion hole is smooth, the length of the upper side of the guide may not be different from that of the lower side thereof necessarily, the upper and lower sides being approximately in parallel in the longitudinal direction of the band body, and the release means is not necessarily provided, and the engagement teeth may not substantially extend over the whole width of the band body necessarily.

If the binding band is provided with the band body having the engaging means on the surface thereof; and if the guide fixed to the band body and forming the insertion hole having the height substantially equal to the thickness of the band body between the guide and the band body, and if the surface of the band body positioned in the insertion hole is smooth, the band body and the guide may be made of metal, and may be formed of an elastic material such as elastic rubber, and the band body and the guide may be formed of different materials from each other, and the engagement teeth may be formed on both surfaces of the band body.

Figure 2A:
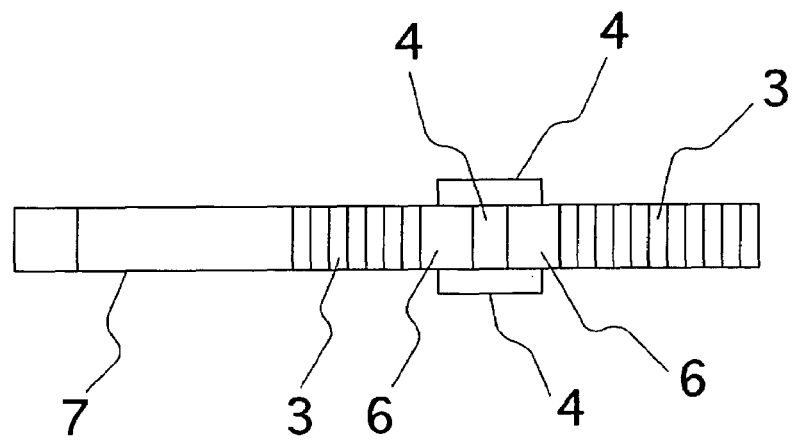
FIG. 2A is a schematic plan view showing another embodiment of the binding band to which the present invention is applied.
Figure 2B:
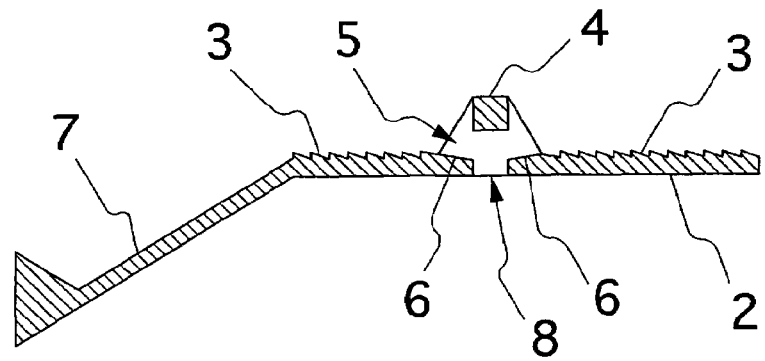
FIG. 2B is a schematic sectional view of the binding band shown in FIG. 2A.
Figure 2C:
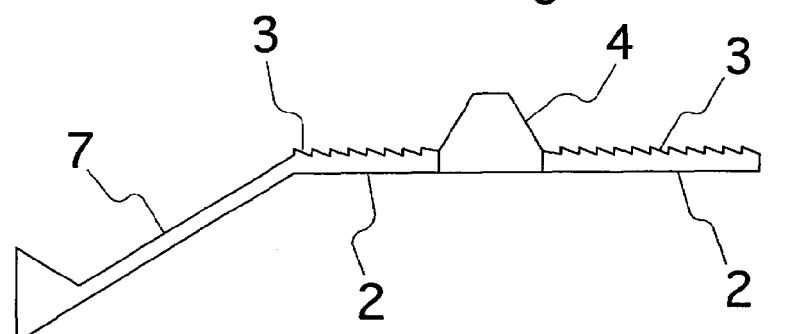
FIG. 2C is a schematic side view of the binding band shown in FIG. 2A.
Figure 2D:
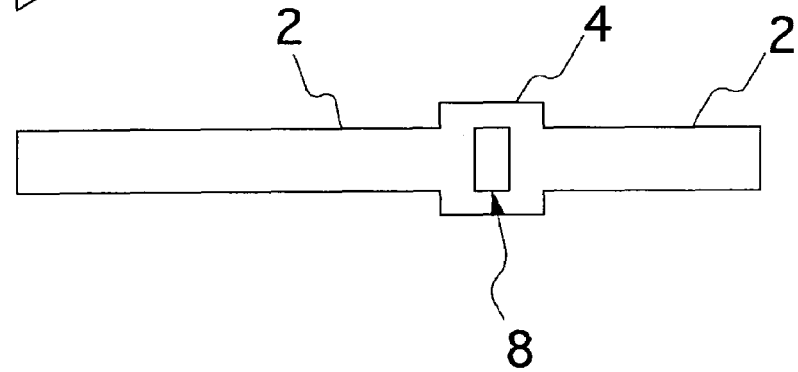
FIG. 2D is a schematic bottom view of the binding band shown in FIG. 2A.

FIG. 2A is a schematic plan view showing another embodiment of the binding band to which the present invention is applied. FIG. 2B is a schematic sectional view of the binding band shown in FIG. 2A. FIG. 2C is a schematic side view of the binding band shown in FIG. 2A. FIG. 2D is a schematic bottom view of the binding band shown in FIG. 2A. A binding band shown in FIG. 2A to FIG. 2D to which the present invention is applied is different from the binding band shown in FIG. 1 in that a through hole 8 is formed on the smooth surface 6 of the band body positioned in the insertion hole. The through hole 8 extends to the surface opposite to the surface of the band body on which the engagement teeth 3 are formed from the smooth surface 6.

Figure 3A:
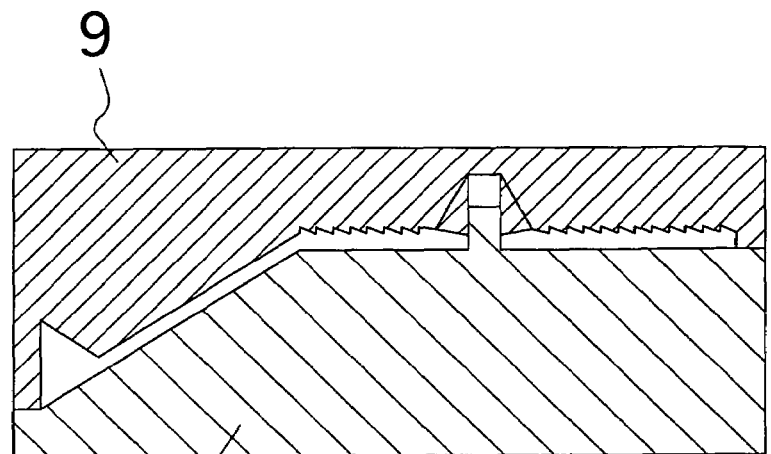
FIG. 3A is a schematic sectional view showing an embodiment of a metal mold used for manufacturing the binding band to which the present invention is applied.
Figure 3B:
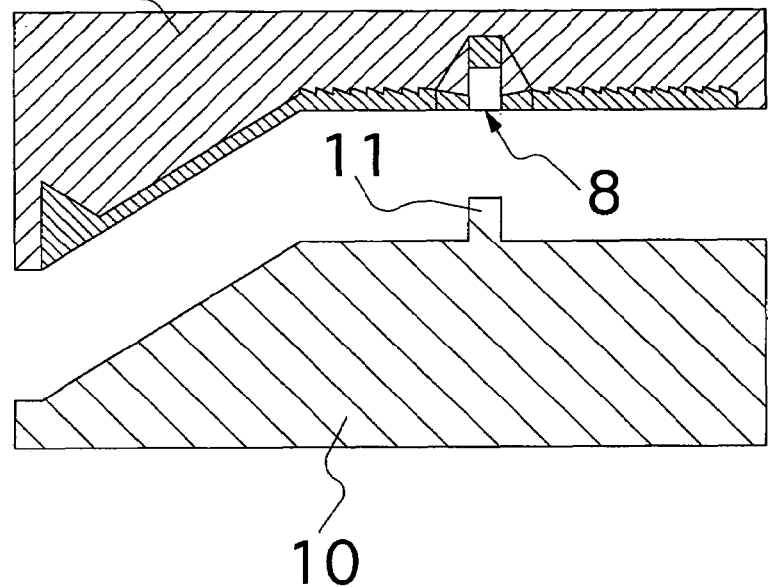
FIG. 3B is a schematic sectional view showing a situation in which a resin is injected to the metal mold shown in FIG. 3A and the metal mold is separated.

FIG. 3A is a schematic sectional view showing an embodiment of a metal mold used for manufacturing the binding band to which the present invention is applied. FIG. 3B is a schematic sectional view showing a situation in which a resin is injected to the metal mold shown in FIG. 3A and the metal mold is separated. As shown in FIG. 3A and FIG. 3B, the binding band to which the present invention is applied is manufactured by injecting the resin into the metal mold composed of an upper metal mold 9 and a lower metal mold 10 to mold, separating the upper metal mold 9 and the lower metal mold 10 in the vertical direction, and taking out the injection-molded binding band from the upper metal mold 9. Here, the insertion hole of the guide and the through hole 8 are formed by the projection part 11 of the lower metal mold 10 at one time.

Figure 4A:
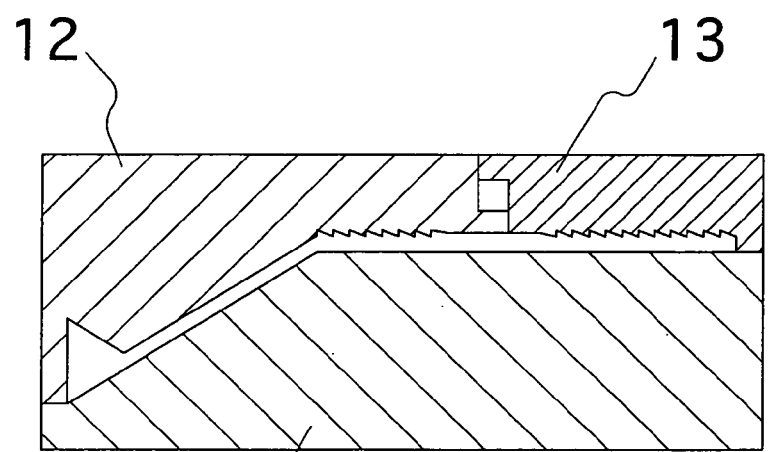
FIG. 4A is a schematic sectional view showing another embodiment of the metal mold used for manufacturing the binding band to which the present invention is applied.
Figure 4B:
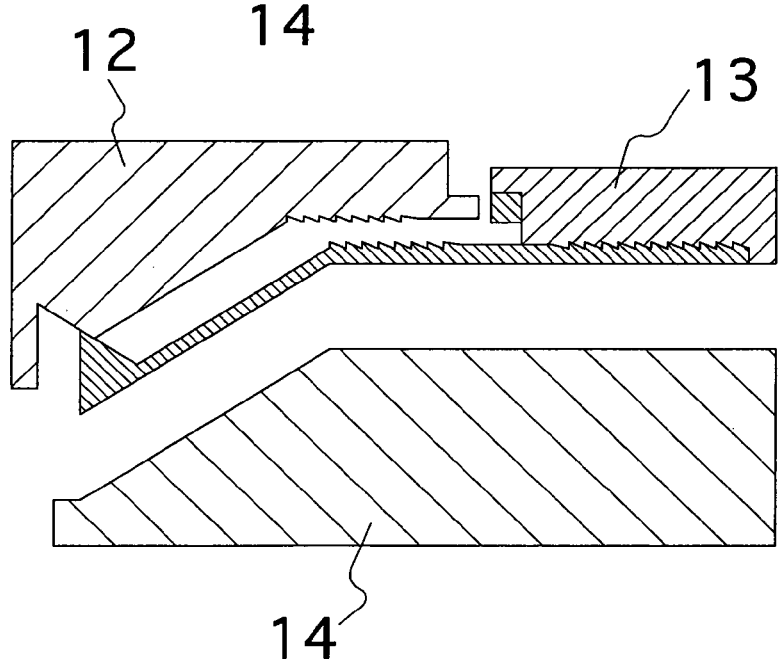
FIG. 4B is a schematic sectional view showing a situation in which the resin is injected to the metal mold shown in FIG. 4A and the metal mold is separated.

FIG. 4A is a schematic sectional view showing another embodiment of the metal mold used for manufacturing the binding band to which the present invention is applied. FIG. 4B is a schematic sectional view showing a situation in which the resin is injected to the metal mold shown in FIG. 4A and the metal mold is separated. However, since the through hole is not formed, the upper metal mold is divided into a first upper metal mold 12 and a second upper metal mold 13 so as to form the insertion hole of the guide, and the projection part is not provided on the lower metal mold 14.

FIG. 5A is a schematic plan view showing another embodiment of the band body constituting the binding band to which the present invention is applied, and FIG. 5B is a schematic sectional view thereof. Here, a plurality of fixing holes 15 penetrating the band body are intermittently formed on the almost central area of the band body 2.

Figure 6A:
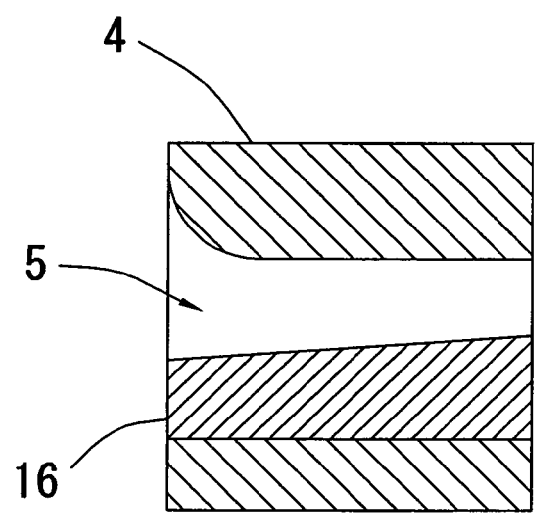
FIG. 6A is a schematic sectional view showing another embodiment of a guide constituting the binding band to which the present invention is applied.
Figure 6B:
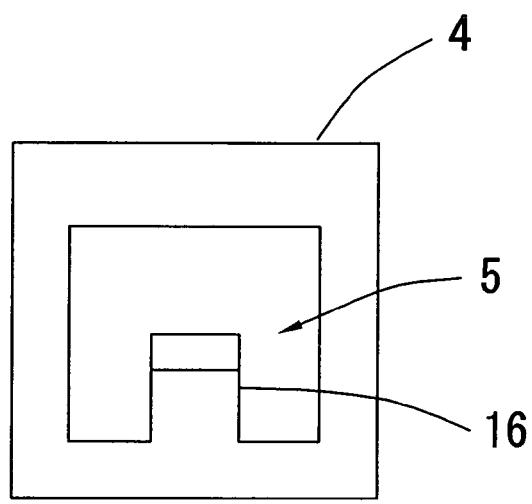
FIG. 6B is a schematic front view of the guide of FIG. 6A.

FIG. 6A is a schematic sectional view showing another embodiment of a guide constituting the binding band to which the present invention is applied, and FIG. 6B is a schematic front view thereof. Here, a fixed projection part 16 facing the insertion hole 5 and having a smooth slope is formed on the guide part 4.

FIG. 7A is a schematic sectional view showing a situation in which the guide is to be attached to the band body. FIG. 7B is a schematic sectional view showing a situation in which the guide is attached to the band body. Here, the band body 2 is inserted into the insertion hole 5 of the guide 4 by moving the guide 4 in an attaching direction 17, and the guide 4 is fixed to the band body 2 by detachably inserting the fixing projection 16 of the guide 4 into the fixing hole 15 of the band body 2. When the object to be bound is bound, the end of the band body 2 is inserted into the insertion hole 5 of the guide 4 by moving the end of the band body 2 in an insertion direction 18.

FIG. 8A is a schematic sectional view of the binding band in the state where an object to be bound (not shown) is bound. FIG. 8B is a schematic sectional view of the binding band in the state where the bind is released. Here, the smooth upper surface of the fixing projection 16 is inclined so that the height may be gradually reduced toward both ends of the band body positioned outside the insertion hole. On the other hand, the inner surface of the upper part of the guide 4 facing a smooth slope of the fixing projection 16 is inclined from midway so that a distance between the slope and the inner surface of the upper part of the guide is gradually inclined toward both ends of the band body positioned outside the insertion hole. As shown in FIG. 8A, near both ends of the band body positioned outside the insertion hole, the band bodies are pressed to each other with the guide as a fulcrum. Thereby, the engagement of the plurality of engagement teeth 3 is attained, and the object to be bound is bound. When the bind is released, as shown in FIG. 8B, the band body slides on the fixing projection by releasing the engagement of the plurality of engagement teeth 3 near both ends of the band body positioned outside the insertion hole, and the bind is released.

FIG. 9A, FIG. 9B, and FIG. 9C are, respectively, a schematic sectional view, schematic plan view and schematic bottom view of the binding band to which the present invention shown in FIG. 2 is applied and a band body fixer is attached. Here, the band body fixer 19 forms the moving area of the band body between the band body fixing part 19 and the engagement teeth 3 which moving area has a height substantially equal to the thickness of the band body 2. Protrusions (not shown) constituting the upper part of the moving area of the band body, projecting substantially in parallel with the engagement teeth 3 and facing each other are formed on the band body fixer 19. The band body fixer 19 is attached to the band body 2 between the guide 4 and the release means 7.

Figure 10:
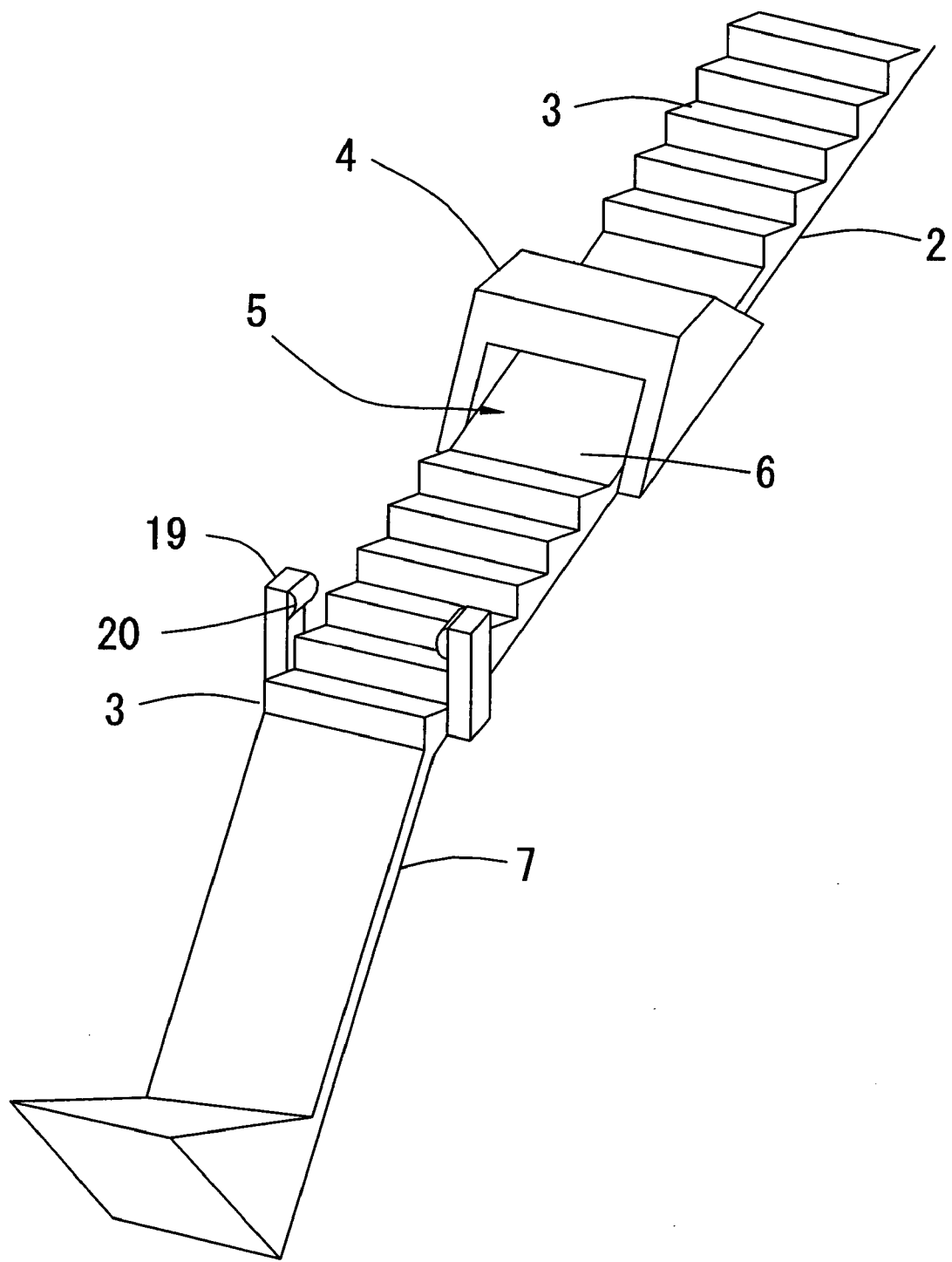
FIG. 10 is a schematic perspective view showing another embodiment of the binding band to which the band body fixer is attached and to which the present invention is applied.

FIG. 10 is a schematic perspective view showing another embodiment of the binding band to which the band body fixer is attached and the present invention is applied. Here, the binding band is the same as the binding band shown in FIG. 9 except that the length of the band body fixer 19 is shorter than that of the band body fixer shown in FIG. 9.

Thus, the binding band to which the present invention is applied, since the guide is fixed to the band body and the surface of the band body positioned in the insertion hole is smooth, the engaging means is not engaged in the insertion hole, and the bind is easily released, and further, the band bodies inserted into the insertion hole are pressed to each other with the guide as the fulcrum, thereby strengthening the engagement of the engaging means and exhibiting the high binding force. Therefore, the binding band can also be composed of the elastic material such as a rubber.

Since the engagement teeth substantially extend over the whole width of the band body in the binding band to which the present invention is applied, the binding band has the improved binding force as compared with the conventional binding band having flat guards which are on both sides of the teeth.

Since the through hole extending to the surface opposite to the surface of the band body on which the engagement teeth are formed from the smooth surface is formed on the smooth surface of the band body positioned in the insertion hole in the binding band to which the present invention is applied, the binding band can be manufactured using a brief metal mold unlike the binding band on which the through hole is not formed. Also, the binding band is excellent in productivity. That is, as shown in FIG. 3A and FIG. 3B, in the manufacture of the binding band on which the through hole is formed, the metal mold has a two-piece structure composed of the upper metal mold and the lower metal mold. Since the metal mold is briefly moved only in a vertical direction at the time of taking out the binding band from the metal mold after injection-molding, the binding band is excellent in productivity. However, as shown in FIG. 4A and FIG. 4B, in the manufacture of the binding band on which the through hole is not formed, the metal mold has a three-piece structure composed of the first upper metal mold, the second upper metal mold and the lower metal mold. Also, since it is necessary to slide the first upper metal mold in the lateral and upward directions referring to the motion of the metal mold at the time of taking out the binding band from the metal mold after injection-molding, and the complicated motion of the metal mold is required, so that the productivity is low.

As shown in FIG. 7, the binding band can be inexpensively manufactured by forming the band body as a different body from the guide as compared with the case where the band body and the guide are integrally formed. Since the guide is fixed by detachably inserting the fixing projection of the guide into the plurality of fixing holes formed on the band body, the position of the guide can be suitably adjusted.

Since the band body fixer is attached to the band body between the guide and the release means as shown in FIG. 9 and FIG. 10, it is possible to prevent the band body to which the band body fixer is not attached from curving opposite to engaging surface between the engagement teeth of the band body which is inserted through the insertion hole and to which the band body fixer is not attached and the engagement teeth of the band body to which the band body fixer is attached, so that the reduction of the binding force can be suppressed.

The invention claimed is:

1. A binding band comprising:
   a band body having two sides, one side of said band body having a plurality of engagement teeth; and
   a guide which is devoid of engagement teeth for engagement with said band body, said guide being fixed to the band body and forming, together with a surface of the band body, an insertion hole between a part of said guide and said surface of the band body, said insertion hole having a height substantially equal to the thickness of the band body, wherein said surface of the band body is a smooth surface.

2. The binding band according to claim 1, wherein said surface of the band body is between the engagement teeth.

3. The binding band according to claim 2, wherein the plurality of engagement teeth substantially extend over the whole width of the band body.

4. The binding band according to claim 1, wherein a release means for releasing the engagement of the engagement teeth is attached to one end of the band body.

5. The binding band according to claim 1, wherein a through hole is formed on said surface of the band body.

6. The binding band according to claim 1, wherein a plurality of through holes are formed on the band body; the guide has a projection having a smooth surface; and the projection is detachably inserted into one of the through holes to fix the guide to the band body.

7. The binding band according to claim 1, further comprising a band body fixer for forming a moving area of the band body between the engagement teeth and the band body fixer which the moving area has a height substantially equal to the thickness of the band body.

8. The binding band according to claim 1, wherein said band body has a first end and a second end, and wherein said engagement teeth are positioned on said band body such that when said band body is disposed in a longitudinal extending position, said engagement teeth are positioned between said guide and said first end and are also positioned between said guide and said second end.

9. The binding band according to claim 8, wherein said engagement teeth which are positioned between said guide and said first end and said engagement teeth which are positioned between said guide and said second end are juxtaposed to said guide.

10. The binding band according to claim 1, wherein said engagement teeth are positioned between said guide and a release means.

11. The binding band according to claim 1, wherein said guide and a release means are spaced from one another.

12. The binding band according to claim 1, wherein said engagement teeth are disposed on only one side of said band body.

* * * * *